US012613120B2

(12) United States Patent
Groll et al.

(10) Patent No.: US 12,613,120 B2
(45) Date of Patent: Apr. 28, 2026

(54) MATERIAL FEEDING APPARATUS AND METHOD

(71) Applicant: Schenck Process Europe GmbH, Darmstadt (DE)

(72) Inventors: Peter Groll, Darmstadt (DE); Holger Hackstein, Darmstadt (DE); Richard Ellis, Doncaster (GB); Randy Monahan, Chagrin Falls, OH (US); Laszlo Ivan, Naperville, IL (US)

(73) Assignee: Qlar Europe GmbH, Darmstadt (DE)

( * ) Notice: Subject to any disclaimer, the term of this patent is extended or adjusted under 35 U.S.C. 154(b) by 202 days.

(21) Appl. No.: 18/542,216

(22) Filed: Dec. 15, 2023

(65) Prior Publication Data

US 2024/0142284 A1 May 2, 2024

Related U.S. Application Data

(63) Continuation of application No. PCT/EP2022/067639, filed on Jun. 28, 2022.

(30) Foreign Application Priority Data

Jun. 28, 2021 (DE) ...................... 10 2021 116 661.6

(51) Int. Cl.
| | |
|---|---|
| *G01N 21/71* | (2006.01) |
| *G01F 13/00* | (2006.01) |
| *G01N 23/222* | (2006.01) |

(52) U.S. Cl.
CPC .......... *G01F 13/001* (2013.01); *G01F 13/003* (2013.01); *G01F 13/005* (2013.01); *G01N 21/718* (2013.01); *G01N 23/222* (2013.01)

(58) Field of Classification Search
CPC .......... G01F 3/001; G01F 3/003; G01F 3/005; G01N 21/718; G01N 23/222
See application file for complete search history.

(56) References Cited

U.S. PATENT DOCUMENTS

| | | | |
|---|---|---|---|
| 4,582,992 A | 4/1986 | Atwell et al. | |
| 10,761,029 B1 * | 9/2020 | Monahan ............... | G01N 21/01 |

(Continued)

FOREIGN PATENT DOCUMENTS

| | | |
|---|---|---|
| CN | 202598587 U | 12/2012 |
| EP | 0171256 A2 | 2/1986 |

(Continued)

OTHER PUBLICATIONS

International Search Report dated Sep. 29, 2022 in corresponding application PCT/EP2022/067639.

*Primary Examiner* — Mark R Gaworecki
(74) *Attorney, Agent, or Firm* — Muncy, Geissler, Olds & Lowe, P.C.

(57) ABSTRACT

A material feeding apparatus and method for providing a controlled feed of material. In particular, there is described a material feeding control apparatus and method comprising a feed rate measurement device capable of providing an online mass and/or volume flow measurement of material and a material sensing device capable of providing an online content (e.g. composition) measurement of the material. The material being fed may, for example, be any suitable bulk material including fuel for a combustion chamber (e.g. a furnace), mined materials such as iron ore and food in a food feeding system. A particular example of the present invention is the provision of a fuel feeding apparatus capable of providing substantially stable combustion in a combustion chamber (e.g. a furnace) which may be incorporated into a cement production line.

22 Claims, 9 Drawing Sheets

(56)        References Cited

U.S. PATENT DOCUMENTS

| | | | | |
|---|---|---|---|---|
| 10,830,674 B2 * | 11/2020 | Nikolajsen | ........... | G01N 21/718 |
| 10,845,239 B1 * | 11/2020 | Monahan | .............. | G01J 3/0243 |
| 2004/0222241 A1 * | 11/2004 | Link | .................... | G01F 13/005 |
| | | | | 222/185.1 |
| 2007/0290008 A1 * | 12/2007 | Becker | ................... | B65G 33/12 |
| | | | | 222/412 |
| 2009/0050654 A1 * | 2/2009 | Ricciardi, Sr. | ......... | G01G 11/10 |
| | | | | 222/1 |
| 2013/0100444 A1 * | 4/2013 | Chesner | ................. | G01J 3/443 |
| | | | | 356/318 |
| 2018/0154397 A1 | 6/2018 | Gauthier et al. | | |
| 2018/0264490 A1 * | 9/2018 | Fushimi | ............... | B05B 7/1486 |
| 2020/0363253 A1 * | 11/2020 | Chen | .................... | G01F 13/003 |

FOREIGN PATENT DOCUMENTS

| | | | | |
|---|---|---|---|---|
| WO | WO-2012079174 A1 * | 6/2012 | ............ | G01F 1/704 |
| WO | WO-2014094038 A1 * | 6/2014 | ............ | B07B 13/00 |
| WO | WO2021045911 A1 | 3/2021 | | |

* cited by examiner

MATERIAL FEEDING APPARATUS AND METHOD

This nonprovisional application is a continuation of International Application No. PCT/EP2022/067639, which was filed on Jun. 28, 2022, and which claims priority to German Patent Application No. 10 2021 116 661.6, which was filed in Germany on Jun. 28, 2021, and which are both herein incorporated by reference.

BACKGROUND OF THE INVENTION

Field of the Invention

The present invention relates to a material feeding apparatus and method for providing a controlled feed of material. In particular, the present invention relates to a material feeding control apparatus and method comprising a feed rate measurement device capable of providing an online mass and/or volume flow measurement of material and a material sensing device capable of providing an online content (e.g. composition) measurement of the material. The material being fed may, for example, be any suitable bulk material including fuel for a combustion chamber (e.g. a furnace), mined materials such as iron ore and food in a food feeding system. A particular example of the present invention is the provision of a fuel feeding apparatus capable of providing substantially stable combustion in a combustion chamber (e.g. a furnace) which may be incorporated into a cement production line.

Description of the Background Art

In the prior art there exists a need for a material feeding apparatus which is capable of providing a constant and controlled feed of material. Such material feeding apparatus may be used in a variety of technical fields such as in the feeding of any type of bulk material. Particular examples may be in the feeding of fuel systems and food systems.

Many manufacturing processes use furnaces or combustion chambers to burn or heat up materials. One such example process which uses the heat from a furnace is the manufacture of cement.

In a cement production line, after the materials are crushed and grinded into a fine powder, the material is then passed into a pre-heat tower (or calciner), where the material can be heated from 60 degrees Celsius to 900 degrees Celsius. The material is then passed into a further heating stage, known as a kiln. The kiln heats the material up to, for example, around 1400 degrees Celsius, thus allowing the necessary chemical reactions to occur, resulting in the output material 'clinker'. The clinker is then cooled, and processed into cement.

Both of these heating stages above are usually heated via hot gasses, which are fed from a furnace to the relevant stages i.e. the pre-heat tower and the kiln. The furnace is heated by fuels, and combusted in the usual manner. Alternatively, the fuel may be burned directly in the pre-heat tower or in the kiln.

The amount (i.e. feed rate) and the quality (e.g. calorific value, humidity, content of dedicated elements) of the fuel, are besides from oxygen, two of the main factors which determine what temperature the combustion chambers or furnaces heat up to. In many processes, such as the production of cement, the heat/hot gasses need to be of consistent quality/at a consistent temperature to ensure a high quality of output product. It is therefore necessary to accurately control the energy of the fuel going into the furnace. The flow rate of the fuel can be measured via mass flow rate, or volume flow rate.

Traditionally, standard hydrocarbon fuels have been used in the combustion chambers. Traditional fuels such as coal provide good burn characteristics, and provide consistent results—which is very important for the cement production industry. However, to improve environmental credentials, furnaces can be used to burn waste fuels in order to reduce significantly the requirement to mine and use coal and also to reduce waste landfill with the associated release of decomposition gasses, which overall brings an environmental benefit.

To introduce alternative fuels into the process of cement manufacture, a secondary feed of fuel is normally utilised. The primary feed is usually from a traditional fuel such as coal, oil and gas. The secondary feed is usually an alternative fuel, such as biofuels, waste derived fuels, agricultural biomass, and refuse derived fuels (RDF).

Calorific value (CV) is a measure of heating power, and is dependent on the composition of the materials in the fuel. This is normally measured in MJ/kg. The higher the CV of the fuel, the higher the temperature will be in the furnace (if other parameters are kept constant).

One of the main disadvantages with using alternative fuels compared to traditional fuels, is that there is a non-homogenous mixture of materials within a batch of alternative fuel. This results in variations of CV per volume of fuel used in the furnace. For example, the CV may be higher in one particular cubic meter of fuel (due to the particular material) than in another particular cubic meter of the same fuel being fed into a furnace. This large variation of calorific value unlikely when using traditional fuels (e.g. coal, oil and gas).

A current solution of addressing this problem when using alternative fuels is to use an indirect feedback loop, which measures the temperature of the furnace, and adjusts the feed parameters (mass or volume flow rate) of the fuel accordingly. For example, if the furnace gets too hot, the volume flow rate of the fuel being inserted into the system can be reduced and vice versa if the furnace is not hot enough. It should be noted that this fuel is ordinarily inserted into the system upstream of the furnace, and must pass through several stages of processing or conveying before entering the furnace. This results in a feedback loop which has a lot of time 'lag'. The fluctuation in the temperature may also reduce the quality of the output material 'clinker'.

The entirety of PCT application WO 2021/045911 A1—Laser Induced Spectroscopy System and Process' is also incorporated herein by reference.

SUMMARY OF THE INVENTION

It is therefore an object of the present invention to obviate or mitigate at least one or more of the aforementioned problems.

It is a further object of at least one aspect of the present invention to provide an improved material feeding apparatus and method for feeding materials to achieve substantially stable material feeding.

It is a further object of at least one aspect of the present invention to provide an improved material feeding apparatus and method capable of reducing variation of the material feed rate over short time periods e.g. such as over 1 second, 10 seconds, 100 seconds and also over long periods such as 1 hour, 1 day and 10 days etc.

It is a yet further object of the present invention to provide an improved material feeding apparatus and method which provides a more accurate and/or constant feed of material.

It is a yet further object of the present invention to provide an improved material feeding apparatus and method which is capable of online monitoring and varying the amount of material being fed.

According to an example of the present invention there is provided a material feeding control apparatus comprising: a feed rate measurement device capable of providing an online mass and/or volume flow measurement of the material; and a material sensing device capable of providing an online content measurement of the material, wherein the material feeding control apparatus is capable of providing a controlled content feed of material.

In general, the present invention relates to a material feeding control apparatus and method comprising a feed rate measurement device and a material sensing device capable of providing a controlled feed of material. The feed of material therefore be adjusted to provide an optimum feed.

The material being fed may be, for example, any suitable bulk material including fuel for a combustion chamber (e.g. a furnace), mined materials such as iron ore and food in a food feeding system.

The online content measurement of the material may define the composition (i.e. chemical make-up) of the material being fed.

The online content may be a measurement of online calorific fuel being fed in a fuel feeding apparatus. Alternatively, the online content may be a measurement of the content and composition of mined materials such as the amount of ion in iron ore and the amount of protein and/or fat and/or water etc in food processing systems.

In examples, any type of online elemental analysis may be conducted including a measurement of the amount and/or the elemental chemical composition of the fed material. For example, this may include the amount of: carbon; hydrogen; oxygen; water; fat; and/or protein of the fed material.

A particular example of the present invention is the provision of a fuel feeding apparatus capable of providing substantially stable combustion in a combustion chamber (e.g. a furnace) which may be incorporated into a cement production line.

The online mass and/or volume measurement of the material and the online content measurement of the material may be performed in real-time.

Alternatively, the online mass and/or volume measurement of the material and the online content measurement of the material may be performed at a desired pre-set time depending on specific requirements and dependent on the processing capabilities of the feed control apparatus. The online mass and/or volume measurement and the online content measurement may therefore be performed on demand or at a regular discrete frequency.

Furthermore, the present invention may therefore provide an improved control of a feeding process by providing an online real-time content analysis of fed material thereby allowing the rate of feed of the material to be constantly adapted and/or changed to provide optimum feeding conditions. As mentioned, a range of material may be fed including fuel for a combustion chamber (e.g. a furnace), mined materials such as iron ore and food in a food feeding system. Any suitable type of bulk material may be part of a controlled feed apparatus according to the present invention.

The present invention provides an improved control of a process by providing an online real-time content (i.e. composition) analysis of fed material thereby allowing the rate of feed of the material to be constantly adapted and/or changed to provide optimum processing conditions.

An example of the present invention provides an improved control of a combustion process by providing an online real-time calorific analysis of fed fuel thereby allowing the rate of feed of the fuel to be constantly adapted and/or changed to provide optimum combustion conditions.

The material feeding control apparatus may provide an apparatus and method capable of reducing variation of the material feed rate over short time periods (e.g. such as over about 1 second, about 10 seconds, about 100 seconds) and also over long periods (e.g. such as about 1 hour, about 1 day and about 10 days etc).

The feed rate measurement device may be a mass feed rate measurement device.

The material feeding control apparatus of the present invention has a number of technical advantages such as improvements in power consumption, improvement in the quality of the final product (e.g. cement, clinker, feed stock conversion, food products etc.) and significant reductions in the amount of environmentally unfriendly gases emitted (e.g. $CO_2$, dust, $NO_x$, $SO_2$, and CO etc.).

Reductions in power consumption of, for example, at least about 5% to 20% are achievable with the material feeding control apparatus of the present invention. This may be achieved by recycling heat generated in the process (e.g. combustion) and/or processing of the material (e.g. cement) which can be used to provide heat to a pre-heating device or the chamber (e.g. combustion chamber). This represents significant cost savings as large amounts of power are used in production lines such as in the production of cement. Furthermore, with a much improved controlled feed of material allows much more stable combustion and/or processing conditions which allows much improved quality of the final products (e.g. cement, clinker, converted feedstock, food products etc.).

The material feeding control apparatus may comprise a control system capable of analysing measurements and data collected from the feed rate measurement device and/or the material sensing device. The control system analyses the measurements in real-time or alternatively at a desired time depending on the needs of the processing capabilities of the control system.

The feed rate measurement device may measure mass flow rate through, for example, using load cells.

The control system may be operably connected to an input feed of the material which may adjust the flow rate of the material to achieve the required substantially constant input feed. For example, a stable calorific input feed may result in stable combustion properties, resulting in a stable and/or controllable combustion chamber temperature.

The control system may be connected to adjustable combustion chamber controls and/or any other type of processing controls, and wherein the data from the material sensing device may be used to adjust combustion chamber controls and/or any other type of processing chamber controls.

Moreover, as it is possible to have accurate control over the feed of material this allows the possibility of specifically controlling processing (e.g. furnace) conditions to provide required reaction conditions to provide desired final products of high consistent quality.

The material feeding control apparatus through the controlled feed of material therefore provides a substantially stable feed of material. A particular example of this is the provision of a controlled feed of fuel to a combustion chamber (e.g. furnace). The material feeding control apparatus may therefore be seen as a material feeder capable of achieving stable/optimized combustion in a combustion chamber (e.g. furnace) and/or any other type of processing such as in the feeding of mined materials such as iron ore and food in a food feeding system.

In an example, the feeding control apparatus may therefore be used to feed inhomogeneous, volatile bulk materials in the form of fuel to achieve stable combustion in a combustion chamber (e.g. furnace). The fuel feeding control apparatus of the present invention therefore allows a more accurate and/or constant feeding process of fuel to achieve a stable combustion in a range of manufacturing processes. The fuel may be defined as calorific material.

The present application is intended to be equally applicable to any combustion or solids based energy conversion process. In examples, the energy conversion apparatus and methods of the present invention include, for example, cement production, combustion based power generation, pyrolysis, gasifiers, lime kilns, carbon conversion, cupolas, etc.

The material feeding control apparatus may be combined with a conveying device such as a screw conveyor in a conveying line of a feeder. The feeder may provide a controlled amount of material to be, for example, conveyed to a production line.

The material (e.g. fuel) feeding apparatus may convey material (e.g. fuel) to, for example, a cement production line, any type of solids fired combustion for energy generation or a solids based conversion to energy or fluid.

Typically, there may be any suitable number of feed rate measurement devices. The feed rate measurement may be a real-time online mass flow rate measurement device. For example, there may be a single real-time online mass flow measurement device or a plurality of real-time online mass flow measurement devices.

The mass flow measurement device may provide a mass flow measurement of the material entering a chamber such as a combustion chamber.

The mass flow measurement device may be any suitable device capable of measuring the mass (i.e. weighing) of the material being fed through the material feeding control apparatus.

The mass flow measurement devices may be at least one or a plurality of gravimetric sensors.

The mass flow measurement device may be a single or dual screw feeder, belt feeder, vibrating feeder or a rotary valve type feeder etc.

The mass flow measurement devices may be load cells. There may be at least one or a plurality of load cells. The load cells may measure the mass of material being fed.

The mass flow measurement device may constantly and/or intermittently monitor the mass of the material being fed.

The material feeding control apparatus may therefore measure the composition (i.e. type) of the material and how much of the material is being sent to a feeder. This measurement may occur constantly in real-time and/or intermittently. For example, in a fuel feeding control apparatus the content and how much fuel is being fed may be measured. In further examples, such as in a food related process the content and how much of a material being fed may be measured. The measurement of the food may include the amount of protein and/or fat of the food. In further examples, the content of mined materials, such as iron ore, the amount of iron being fed may be measured.

The material feeding apparatus may also comprise a hopper through which material may be fed. The hopper may also comprise at least one or a series of agitators to assist with the flow of material.

The material may initially be fed in a substantially vertical manner and/or a substantial horizontal manner into the material feeding control apparatus.

The material sensing device may be any suitable form of device capable of determining the composition (i.e. type) of the material being fed into the material feeding control apparatus.

The material sensing device may provide an online real-time measurement of the content and composition of the material being fed. This may include the chemical elemental composition of the material being fed e.g. the amount of iron in iron ore and the elemental composition of carbon, water, oxygen fat and/or protein of the fed material. In examples, the material sensing device may be defined as a calorific analyser which may provide real-time data of the calorific value of fuel.

Typically, the material sensing device may be a spectroscopic technique such as a laser spectroscopic technique.

The material sensing device may be a laser induced breakdown spectroscopy (LIBS). In such a spectroscopic technique, a pulsed laser may be used to breakdown a small amount of matter from the material. The small amount of matter broken down from the material may be ionised and formed into a localised plasma. The plasma may emit a spectrum of light frequencies from the material. The spectrum of light may be collected by a spectrometer and analysed to determine the elemental make-up of the fuel. Such a technique is described in PCT application WO 2021/045911 A1—Laser Induced Spectroscopy System and Process' which is incorporated herein by reference.

Also, any other type of spectroscopic or online elemental analysis technique may be used to determine the elemental composition (i.e. type) of the material being fed into the material feeding control apparatus.

The spectroscopic techniques may result in the analysis of emitted plasma from the material. A spectrometer may be used to convert and interpret light from a plasma plume to relative intensity as a function of wavelength (i.e. colour). Well known databases such as the NIST (National Institute of Standards and Technology) may be used to correlate spectral peaks from the spectrometers to specific atomic elements or molecules. Areas under the respective spectral peaks may be used to calculate the relative amounts of each respective element. From each of the spectral peaks a curve may be fit (e.g. using a Lorentzian profile). Using a Lorentzian profile may be advantageous due to the exponential vibrational population relaxation where the coherence lifetime is much less than the amplitude correlation time. Each fit curve may then be integrated to find the area under each curve. The relative amount of area under each of the multiple (i.e. elemental) curves is proportional to the relative abundance of these elements in the material being analysed.

As a material sensing device, a PGNA (Prompt Gamma Neutron Activation) technique may also be used. Any other suitable material sensing device or technique may be used.

The material feeding control apparatus may comprise an outlet feeder through which a controlled feed of material may exit. The material may then enter a production line such as a cement production line. The material may also enter a range of other production lines such as the processing of mined material such as iron ore and food feeding systems and the monitoring of protein and/or fat content.

The material feeding control apparatus may therefore measure (i.e. define) what material and how much material is being sent into a feeder. The amount of material exiting the material feeding control apparatus may therefore be controlled and/or monitored. The control and/or monitoring may occur in real-time and/or intermittently allowing a highly accurate feed of material to be obtained.

Prior to the material being fed into the material feeding control apparatus the material may be initially milled and/or ground and/or broken up. A milling apparatus therefore be used to reduce the size of the material being fed into the material feeding control apparatus. For example, particulate sizes may be reduced from about 80-100 mm down to less than 10 mm in size during the milling process.

In examples, where the material being fed is fuel, the fuel may be any suitable type of fuel material. For example, the fuel may be primary and/or secondary fuel. The primary feed may be a traditional material such as coal, oil and gas. The secondary feed may be any suitable alternative fuel such as biofuels, waste derived fuels, agricultural biomass, food and food waste (e.g. any type of food waste material such as peanuts) and/or refuse derived fuels (RDF). The secondary feed may also be selected from any one of or combination of the following: shredded plastics; foil chips; conditioned sewage sludge; woodchips and saw meal; shredded or full tyres; palm kernel shells; rice husks; animal meal etc.

According to a further aspect of the present invention there is provided a fuel feeding control apparatus comprising: a feed rate measurement device capable of providing an online mass and/or volume flow measurement of the fuel; and a material sensing device capable of providing an online calorific value measurement of the fuel, wherein the fuel feeding control apparatus is capable of providing a controlled calorific feed of fuel.

According to a further aspect of the present invention there is provided a method of providing a controlled feed of material comprising: providing a feed rate measurement device capable of providing an online mass and/or volume flow measurement of the material; and providing a material sensing device capable of providing an online content measurement of the material, thereby providing a controlled feed of material.

The online mass and/or volume measurement of the material and the online content measurement of the material may be performed in real-time.

The feed rate measurement device and material sensing device may be in the form of a material feeding apparatus as defined in the first and second aspects.

The feed rate measurement device may be a mass flow rate measurement device.

The method may be part of, for example, any combustion or solids based energy conversion process. In examples, the energy conversion methods may include, for example, cement production, combustion based power generation, pyrolysis, gasifiers, lime kilns, carbon conversion, cupolas, etc.

The method may be part of, for example, feeding a range of bulk material including mined materials such as iron ore and food in a food feeding system.

There may also be provided an apparatus comprising: a chamber; an input feed for feeding material into the chamber; a material feeding control apparatus operably connected to the input feed. The material feeding control apparatus comprising a feed rate measurement device capable of providing an online mass and/or volume flow measurement of the material and a material sensing device capable of providing an online content value measurement of the material, wherein the material feeding control apparatus is capable of providing a controlled feed of material to the chamber.

The chamber may be a combustion chamber. The combustion apparatus may form part of, for example, any combustion or solids based energy conversion apparatus. The energy conversion apparatus may include, for example, cement production apparatus, combustion based power generation apparatus, pyrolysis apparatus, gasifier apparatus, lime kilns, carbon conversion apparatus, cupolas, etc.

The chamber may be a chamber for food processing or the processing of any other material such as mined material.

The apparatus may comprise a pre-heating device such as a calciner.

The chamber may be any suitable chamber capable of burning and/or transporting and/or processing material.

The chamber may be a combustion chamber which may be any suitable chamber capable of burning primary and/or secondary fuel. The combustion chamber may be, for example, a furnace or kiln.

The combustion chamber may be a furnace capable of being heated up to, for example, about 1400° C.

Raw material such as cement production may be fed directly into the combustion chamber. Further, the raw material may be pre-heated in the pre-heating device such as the calciner and then fed into the combustion chamber.

The material feeding control apparatus may provide a substantially constant and controlled flow of material to the input feed which is then used to feed material into the chamber. Typically, the input feed may comprise any suitable type of conveying or feeding device.

The input feed may comprise any one of or combination of the following: a screw feeder (e.g. a single or dual screw feeder); screw conveyor; belt feeder; star feeder; vibrating feeder; rotary valve type feeder etc.

The apparatus may comprise a plurality of material feeding control apparatus. The material feeding control apparatus may be placed at numerous locations in the apparatus.

For example, material feeding control apparatus may be used to control and/or monitor the amount of material (e.g. primary and/or secondary fuels) being fed to the pre-heating device and/or the chamber.

Furthermore, the material feeding control apparatus may be used to control and/or monitor the amount of raw material being fed into the apparatus (e.g. a combustion apparatus).

Processed material in the form of clinker (e.g. cement) may exit the apparatus from the chamber. A further material feeding control apparatus may be used to control and/or monitor the amount of processed material exiting the apparatus.

A particular technical feature of the present invention is that heat generated in the apparatus and/or processing of the material (e.g. cement) may be recycled and used, for example, to provide heat to the pre-heating device and/or chamber (e.g. combustion chamber); or to pre-heat and/or dry the material (e.g. fuel) itself. The apparatus of the present invention is therefore highly energy efficient.

The material feeding control apparatus may be located upstream from the chamber.

The apparatus may comprise a conveying line located between the input feed and the chamber, wherein the mass flow measurement device and/or material sensing device may be located.

According to an example, there is provided a combustion apparatus comprising: a combustion chamber; an input feed for feeding fuel into the combustion chamber; a fuel feeding control apparatus operably connected to the input feed. The fuel feeding control apparatus comprising a feed rate measurement device capable of providing an online mass and/or volume flow measurement of the fuel and a material sensing device capable of providing an online calorific value measurement of the fuel, wherein the fuel feeding control apparatus is capable of providing a controlled feed of fuel to the combustion chamber.

According to an example, there is provided a method of providing a substantially constant and controlled flow of material to an apparatus comprising: providing a chamber; feeding material via an input feed into the chamber; connecting a material feeding control apparatus to the input feed. The material feeding control apparatus comprising a feed rate measurement device capable of providing an online mass and/or volume flow measurement of the material and a material sensing device capable of providing an online content measurement of the material, wherein the material feeding control apparatus is capable of providing a controlled feed of material to the chamber.

According to an example, there is also provided a method of providing a substantially constant and controlled flow of fuel to a combustion apparatus comprising: providing a combustion chamber; feeding fuel via an input feed into the combustion chamber; connecting a fuel feeding control apparatus to the input feed. The fuel feeding control apparatus comprising a feed rate measurement device capable of providing an online mass and/or volume flow measurement of the fuel and a material sensing device capable of providing an online calorific value measurement of the fuel, wherein the fuel feeding control apparatus is capable of providing a controlled feed of fuel to the combustion chamber.

Further provided is an apparatus for controlling the feed rate of material into a chamber, the apparatus comprising: a chamber; an input feed for the material; a feed rate measurement device capable of providing an online mass and/or volume flow measurement of the material and a material sensing device capable of providing an online content measurement of the material; and a control system which is operably connected to the input feed, the feed rate measurement device and the material sensing device.

Also provided is an apparatus for controlling the feed rate of fuel into a combustion chamber, the apparatus comprising: a combustion chamber; an input feed for the fuel; a feed rate measurement device capable of providing an online mass and/or volume flow measurement of the fuel and a material sensing device capable of providing an online calorific value measurement of the fuel; and a control system which is operably connected to the input feed, the feed rate measurement device and the material sensing device.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The present invention therefore relates to a material feeding control apparatus and method comprising a feed rate measurement device and a material sensing device capable of providing a controlled feed of material. The material being fed may be, for example, any suitable bulk material including fuel for a combustion chamber (e.g. a furnace), mined materials such as iron ore and food in a food feeding system. For example, the online content may be a measurement of online calorific fuel being fed in a fuel feeding apparatus. Alternatively, the online content may be a measurement of the content and composition of mined materials such as the amount of iron in iron ore and the amount of protein and/or fat and/or water in food. Furthermore, using the apparatus herein described, any type of online elemental analysis may be conducted including a measurement of the amount and the elemental composition of carbon, water, fat and/or protein of the fed material.

The material feeding control apparatus is used to feed materials to obtain a controlled and adjustable feed. For example, the material feeding control apparatus of the present invention therefore allows a more accurate and/or constant feeding process of material to achieve a stable combustion in a range of manufacturing processes.

Although specific examples are described in the detailed description herein it should be appreciated that the material feeding control apparatus is intended to be equally applicable to any combustion or solids based energy conversion process. This includes energy conversion apparatus selected from any of the following: cement production; combustion based power generation; pyrolysis; gasifiers; lime kilns; carbon conversion; cupolas, etc.

The feed rate measurement device (e.g. mass flow measurement device) is capable of providing an online mass and/or volume flow measurement of the material and the material sensing device is capable of providing an online content (i.e. composition) measurement of the material. The online mass and/or volume measurement of the material and the online material value measurement of the material may be performed in real-time. Alternatively, the online mass and/or volume measurement of the material and the online content measurement of the material may be performed at a desired pre-set time depending on specific requirements and dependent on the processing capabilities of the feed control apparatus. The online mass and/or volume measurement and the online material measurement may therefore be performed on demand or at a regular discrete frequency.

Figure 1:
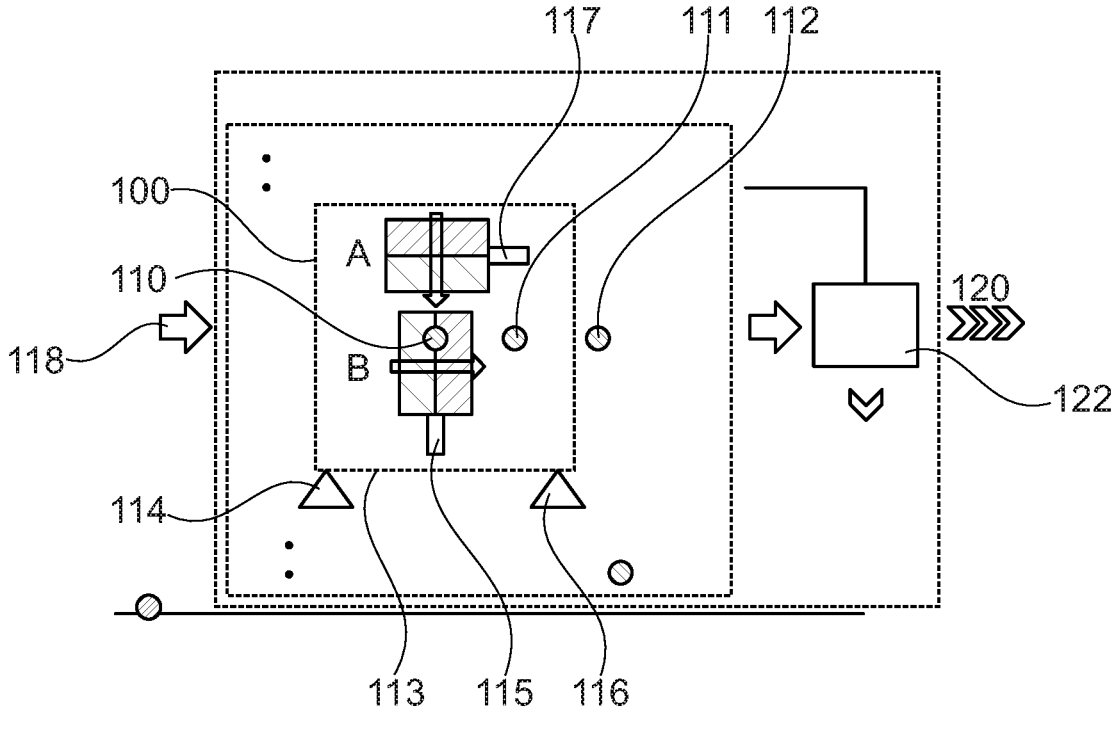
FIG. 1 is a schematic representation of a material feeding apparatus comprising a mass flow measurement and a material sensing device according to an example of the present invention.

FIG. 1 is a schematic representation of a material feeding apparatus of the present invention generally designated 100. The material being fed may be any suitable type of bulk material including: fuel; mined materials such as iron ore; and/or food. The material feeding control apparatus 100 comprises a series of material sensing devices 115, 117 and a feed rate measurement device such as a mass flow measurement device 113 comprised of a series of load cells 114, 116. The mass flow measurement device 113 may be defined as a gravimetric measurement device. Although two material sensing devices 115, 117 are shown this should not be interpreted as limiting and there may be a single material sensing device or a plurality of material sensing devices. Moreover, the mass flow measurement device 113 may comprise a single load cell or a plurality of load cells.

As mentioned above, the feed rate measurement device in the form of the mass flow measurement device 113 is capable of providing an online mass flow measurement of the material and the material sensing devices 115, 117 are capable of providing an online content measurement of the material. The online mass measurement of the material and the online content value measurement of the material is performed in real-time.

The online mass measurement of the material and the online material measurement of the material can be performed on a continuous or semi-continuous basis. Alternatively, the online mass measurement of the material and the online content measurement of the material is discrete and is performed on demand or at a regular discrete frequency.

The material feeding control apparatus 100 is capable of reducing variation of the material feed rate over short time periods (e.g. such as over about 1 second, about 10 seconds, about 100 seconds) and also over long periods (e.g. such as about 1 hour, about 1 day and about 10 days etc.).

FIG. 1 also shows that there are additional physical sensors 110, 111, 112 which may be used to measure, for example, pressure, temperature etc. at various points in the material feeding apparatus 100.

FIG. 1 also shows that there is a source 118 of material being fed into the material feeding control apparatus 100. FIG. 1 shows two available options for the direction of the material to be fed into the material feeding apparatus 100 from the source 118. As shown in option 'A the material may be fed in a substantially vertical direction into the material feeding control apparatus 100. Alternatively, option CB' shows the material being fed in a substantially horizontal direction into the material feeding control apparatus 100.

Exiting via a feeder 122 there is a controlled feed of material 120.

The material being fed into the source 118 may be fuel intended to burn and/or combust in a combustion chamber e.g. furnace. The fuel may be a primary and/or secondary fuel feed in a combustion apparatus. This is defined in more detail below. The primary fuel feed is a traditional material such as coal, oil and gas. The secondary fuel feed is any suitable alternative fuel such as biofuels, waste derived fuels, agricultural biomass, and/or refuse derived fuels (RDF). The secondary fuel feed may also be selected from any one of or combination of the following: shredded plastics; foil chips; conditioned sewage sludge; woodchips and saw meal; shredded or full tyres; palm kernel shells; rice husks; animal meal etc.

Alternatively, the material being fed into the source 118 may be any type of bulk material such as mined materials (e.g. iron ore) and food in a food feeding system.

The material sensing device of the present invention may be any suitable device capable of analysing and/or detecting the composition (i.e. the chemical make-up) of the fed material. The material sensing device may therefore be in the form of an elemental analyser capable of detecting the chemical make-up and amount (i.e. abundance) of each element and/or compound in the material. The material sensing device can be a spectroscopic technique such as a laser spectroscopic technique.

The mass flow measurement device may be any suitable device capable of measuring the load (i.e. weight) of the fed material. The mass flow measurement device may comprise at least one or a series of weighing devices such as load cells.

Figure 2:
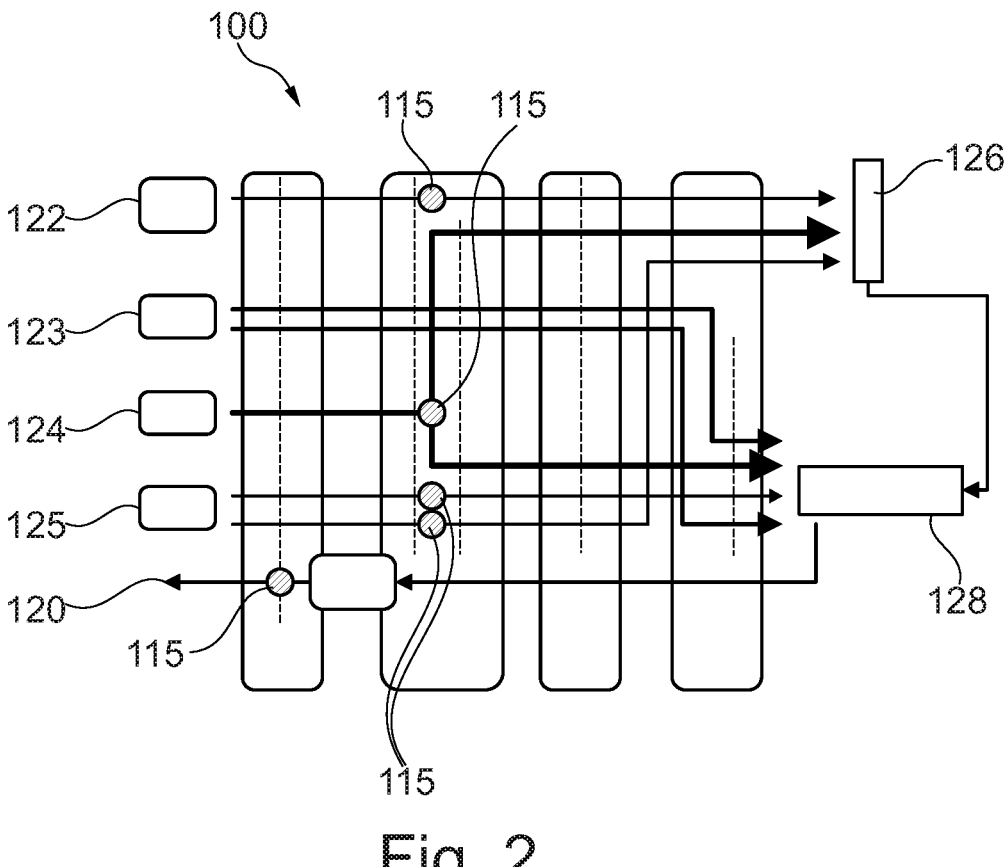
FIG. 2 is a flow diagram of a series of material feeding apparatus according to an example of the present invention incorporated into a cement manufacturing plant.

FIG. 2 is a flow diagram of a series of fuel feeding control apparatus according to an example of the present invention incorporated into a cement manufacturing plant.

Starting on the left, and working down from the top, there is shown raw material 122, controlled combustion air 123, alternative fuel 124, and primary fuel 125. On the right side of the diagram, there is shown a pre-heat tower (or calciner) 126, and a kiln 128 (e.g. a combustion chamber). As shown by the arrows, the raw material 122 is passed directly into the pre-heat tower 126 to be pre-heated, where it then passes into the kiln 128, to be heated to much higher temperatures. The output 120 from the kiln 128 is called clinker, and is shown exiting the flow diagram at the bottom left.

The controlled combustion air 123 is primarily used for the main burner of the kiln 128, to control the combustion process to burn the clinker. The alternative fuel 124 and the primary fuel 125 are both fed into the pre-heat tower 126 and the kiln 128 for burning.

Each feed of material (e.g. fuel or cement product) has a material sensing device 115 according to the present invention in the feed line. These are in example locations, and should not be construed to be limiting.

The material sensing devices 115 are shown to be located upstream of the combustion chambers in the pre-heat tower 126 and the kiln 128. This allows the primary and/or alternative (e.g. secondary) fuel 124,125 to be analysed before being burned in the combustion chambers. This analysis can determine the calorific value of the fuels about to be burned. As explained previously, the calorific value of the primary fuel 125 should be relatively stable, in comparison with the calorific value of the alternative fuel 124.

If the calorific value of the alternative fuel 124 happens to be higher than is expected, then the parameters of the combustion chambers may be adjusted accordingly. Alternatively, the flow rate of the secondary fuel 124 into the combustion chambers may be reduced. If the calorific value of the alternative fuel 124 is lower than expected, then the flow rate of the fuel into the combustion chambers may be increased.

If the system in FIG. 2 is coupled with gravimetric measurements as in FIG. 1, the calorific flow rate of the fuel may be calculated, since the calorific value of the fuel is known and the mass flow rate of the fuel is known. This gives the operator of the cement manufacturing plant accurate data which is critical for precise burn characteristics.

Figure 3:
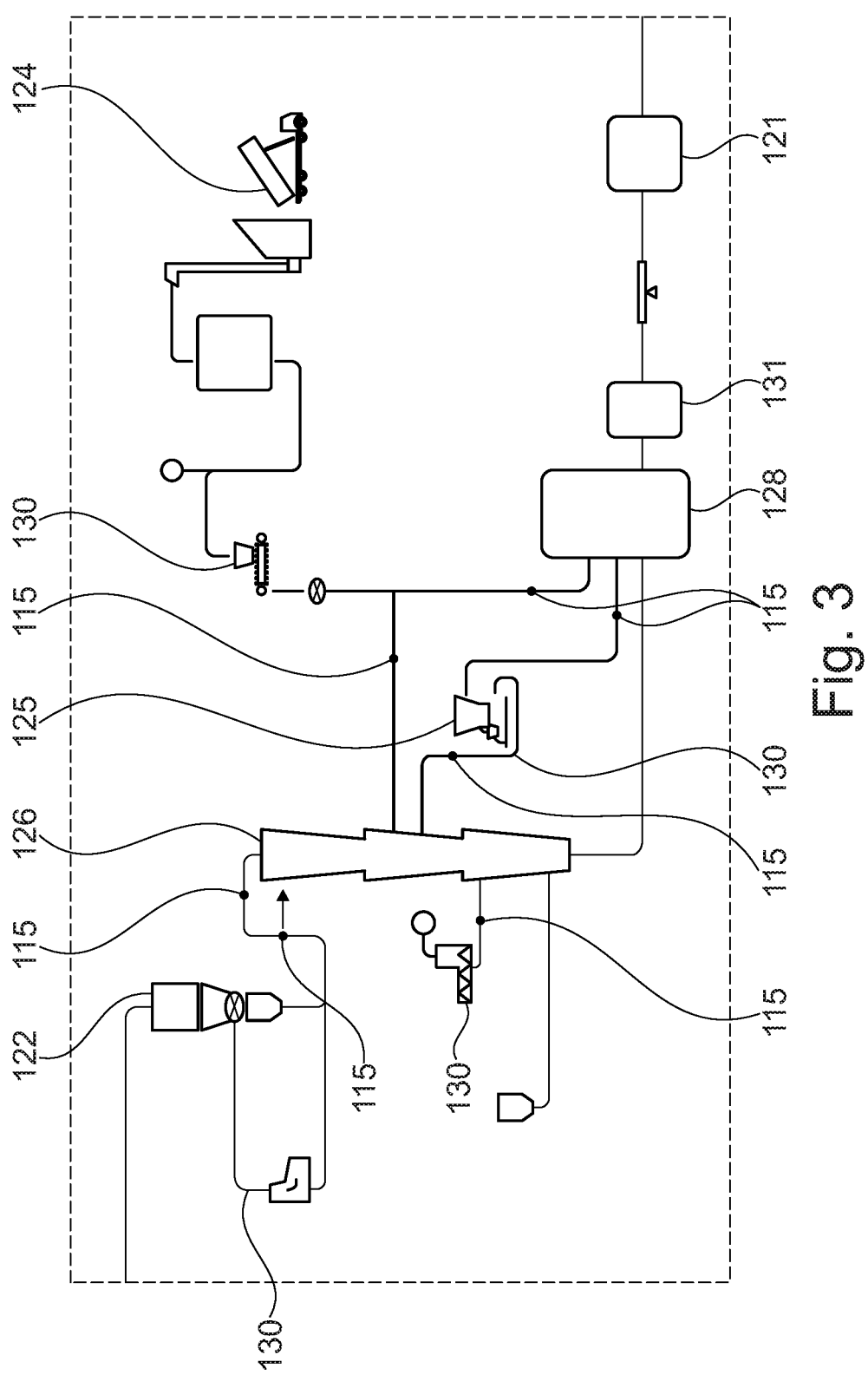
FIG. 3 is a schematic representation of a series of material feeding apparatus indicating where the material feeding apparatus are located according to an example of the present invention incorporated into a cement manufacturing plant.

FIG. 3 is a schematic representation of a series of fuel feeding apparatus indicating where the fuel feeding apparatus are located according to an example of the present invention incorporated into a cement manufacturing plant.

In this diagram, the raw material 122 is introduced at the top left of the image, where it is processed and milled in various stages. The raw material 122 can also be seen to pass through a mass flow measurement device 130. This could also be a volumetric flow measurement device, and should be merely seen as an exemplary flow rate measurement device. The material then passes through a material sensing device 110 according to the present invention, before entering into the pre-heat tower 126. The material sensing devices 115 are represented as filled in circles in the diagram, located prior to material entering into a combustion chamber (such as the pre-heat tower 126 or the kiln 128). Once again, the number of devices 110 or the location of them in the system should not be construed to be limiting, but are given as examples only.

After the pre-heat tower 126, the material then passes into the kiln 128 to be further heated and processed, before exiting via a cooler 131 as output material (clinker) and stored in a silo 121.

The primary fuel 125 enters into the system and is fed into a mass flow measurement device 130. This mass flow measurement device 130 controls the amount of primary fuel 125 to be passed to the combustion chambers 126, 128. The primary fuel 125 is then fed into the pre-heat tower 126 and to the kiln 128, via the material sensing devices 115 according to the present invention. This gives the plant operator a real-time online measurement of the mass flow rate of the fuel, and also a real-time online measurement of the calorific value of the fuel, providing a calorific flow rate—which is important for reasons given previously.

The secondary fuel 124 is also introduced into a mass flow measurement/feeder device 130, and is then fed into the pre-heat tower 126 and the kiln 128 via the material sensing devices 110 according to the present invention. Again, this is advantageous for reasons given before.

The whole system shown in FIG. 3 may be controlled via a control system, which is operably connected to flow rate measurement devices 130 and to the material sensing devices 110.

Figure 4:
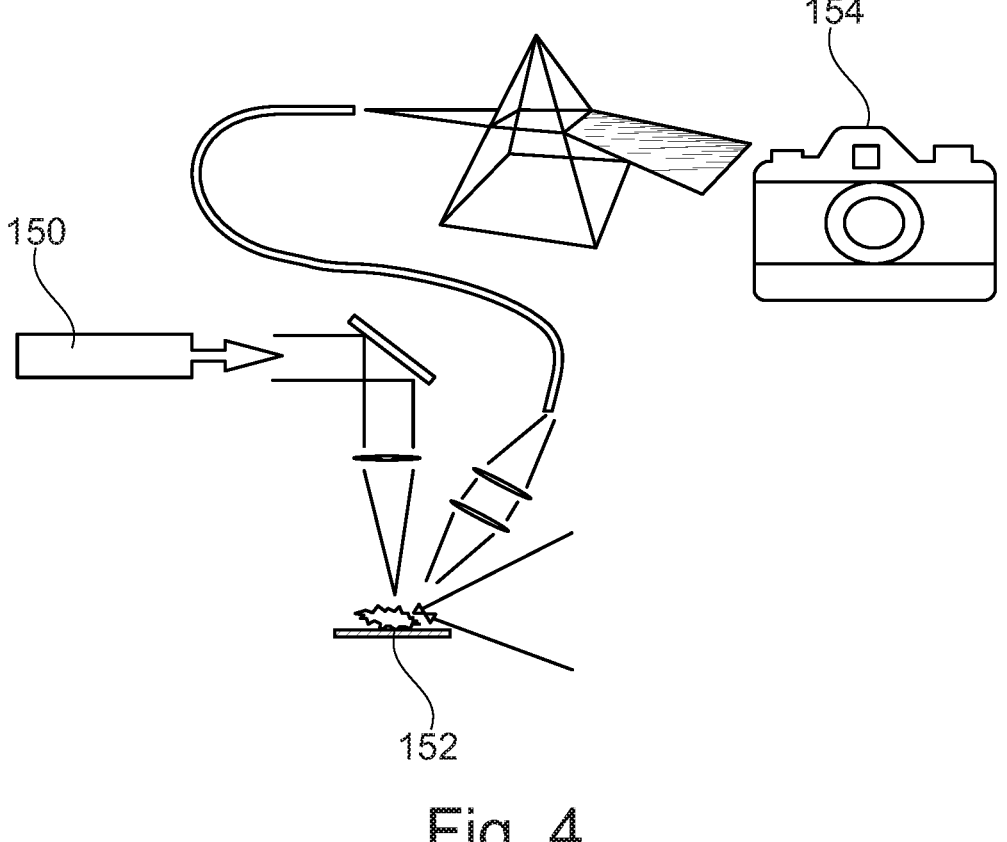
FIG. 4 is a representation of Laser Induced Breakdown Spectroscopy (LIBS), which may be used in the analysing of the material feeding apparatus according to an example of the present invention.

FIG. 4 is a representation of Laser Induced Breakdown Spectroscopy (LIBS), which may be used in the content (i.e. composition) analysing of the material feeding apparatus according to an example of the present invention. The content analysis according to the present invention may take place in a real-time online manner using the material sensing devices 110 as previously described.

The technique uses a pulsed laser 150 to break down a small amount of matter from the target surface of the material, ionizing the material and forming a localized plasma. The plasma emits a spectrum of light frequencies from the target material 152. This light is collected by a spectrometer 154 and analysed to determine the elemental make-up. This elemental make up can then be used to give composition information on the material (e.g. chemical elemental make-up including amount of carbon, water, oxygen; calorific value; protein content; fat content) which can then be used to control the flow rate of material into the chamber (e.g. a combustion chamber). The process and apparatus is described in greater detail in 'WO 2021/045911 A1—Laser Induced Spectroscopy System and Process'.

The data from the LIBS technique can be information such as any one of or combination of the following: chemical composition; elemental composition; moisture content; ash content; calorific value; and ash fusion temperature. Any of these, or other material parameters may be used to input online real-time data into a feed control system according to the present invention.

Generally, a LIBS system comprises a laser housing comprising a laser 150 (for example an Nd:YAG laser), a spectrometer 154, and a linkage assembly to connect the laser housing to the sample apparatus. In examples according to the present invention which have previously been described, the LIBS system shown in FIG. 4 would be located within the material sensing devices 110, which take data of the material before the enter into the combustion chambers. The laser would be directed into the sample reading area, and a spectroscopic analysis would take place, giving information on the elements present in the material. This data, coupled with the flow rate, can give a range of data e.g. calorific rate to a fuel, composition content of food being fed; composition of mined material such as the amount of iron in iron ore.

As already mentioned, instead of using LIBS in the material sensing devices 110, there may be any other material identification methods or apparatus used, such as Prompt Gamma Neutron Activation (PGNA). PGNA is an alternative widely used spectroscopic technique, which can determine the presence and amount of various elements simultaneously. The sample sizes can range from micrograms to grams. The material sensing devices 110 should not be limited to LIBS or PGNA, as these are merely given as examples.

Figure 5:
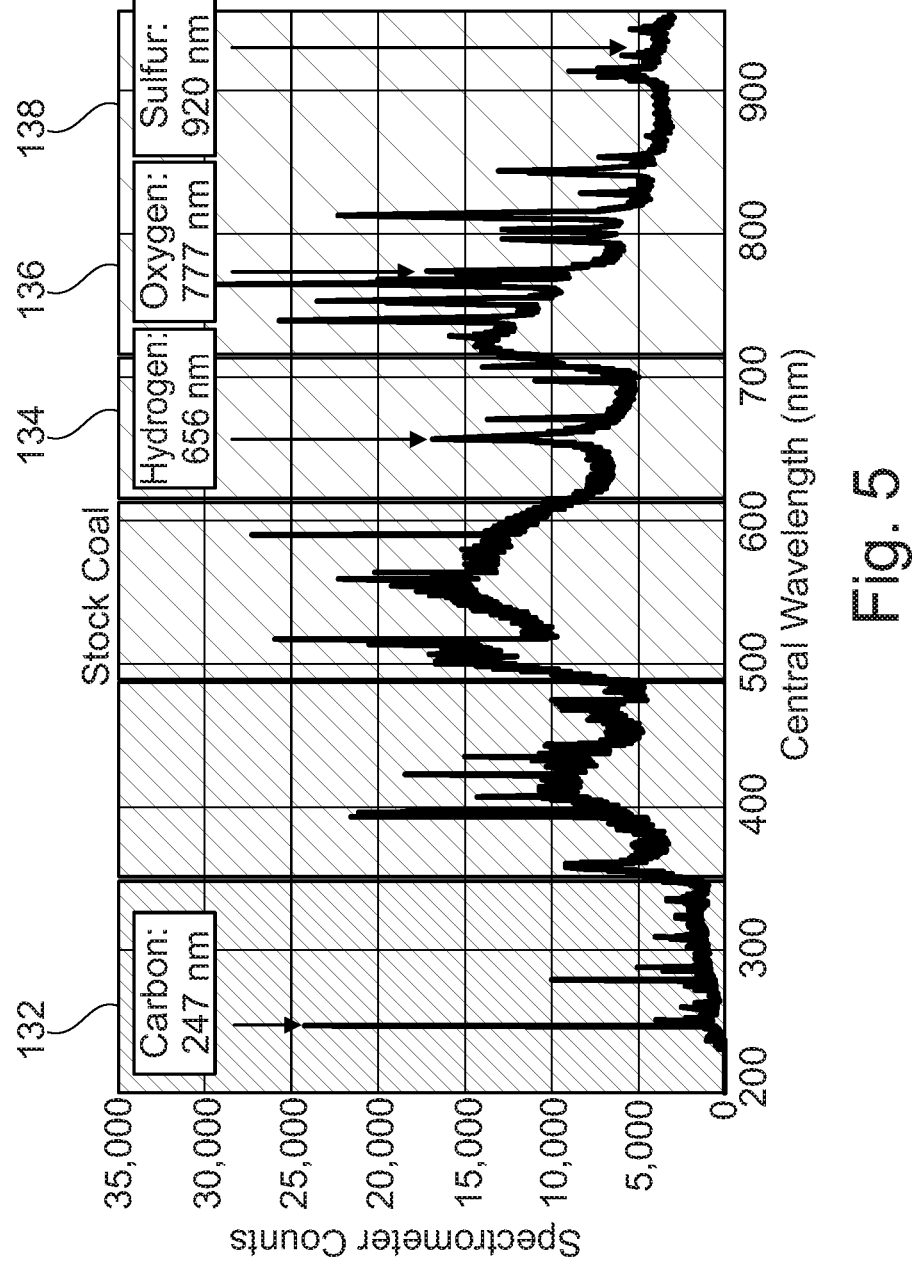
FIG. 5 is a representation of the spectral output from the Laser Induced Breakdown Spectroscopy (LIBS) performed by the material feeding apparatus according to an example of the present invention.

FIG. 5 is a representation of the spectral output from the Laser Induced Breakdown Spectroscopy (LIBS) performed by a fuel feeding apparatus according to an example of the present invention. The Y axis shows spectrometer counts, and the X axis shows the wavelengths of the light emitted after LIBS. The spikes on the graph indicate the number of units of a particular element in the sample. Going from left to right, there is Carbon 132, Hydrogen 134, Oxygen 136 and Sulphur 138. This data can then be correlated with databases, which give the calorific value of each element. This data can then be used to control the online flow rate of the fuel into the combustion chambers, according to the present invention. The data can also be used for other control systems in the production line, in accordance with what is being produced. It will easily be envisaged that other elements may be present in the spectroscopic analysis, and that this is a mere example.

The output from the spectrometer, as shown in FIG. 5, is a plasma analysis. Spectrometers convert and interpret light from the plasma plume to relative intensity as a function of wavelength (colour). Multiple spectrometers (5 in this example) are used to cover the broadband wavelengths of potential interest.

NIST (National Institute of Standards and Technology) databases are used to correlate peaks from the spectrometers to specific atomic elements or molecules. The areas under the respective spectral peaks can be used to calculate the relative amounts of each respective element once the system is calibrated, for example with a mass flow rate meter. The absolute mass of the elements can then be calculated, for a given flow rate and collection time.

This data is then utilised in controlling the flow rates of the fuel going to the combustion chambers.

Figure 6:
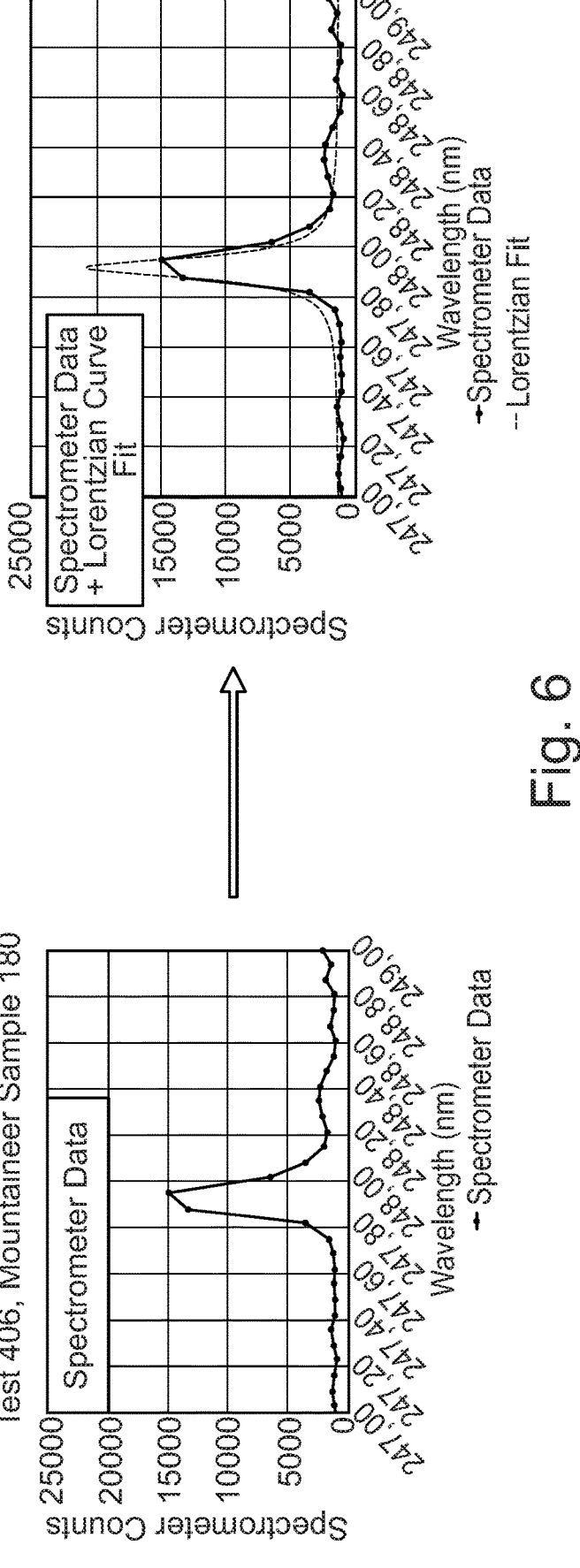
FIG. 6 is a representation of the analysis of the spectral output from the Laser Induced Breakdown Spectroscopy (LIBS) performed by the material feeding apparatus to determine the amount of material being fed according to an example of the present invention.

FIG. 6 is a representation of the analysis of the spectral output from the Laser Induced Breakdown Spectroscopy (LIBS) performed by the material feeding control apparatus to determine the amount of material being fed according to an example of the present invention.

For each of the elemental peaks of interest, a curve is fit (using a Lorentzian profile—due to the exponential vibrational population relaxation where the coherence lifetime is much less than the amplitude correlation time). Each fit curve is then integrated to find the area under them. The relative amount of area under these multiple (elemental) curves is proportional to the relative abundance of these elements in the material which was ablated. As above, these data can be used for advantageous reasons, when coupled with the material mass or volume flow rate data.

Figure 7:
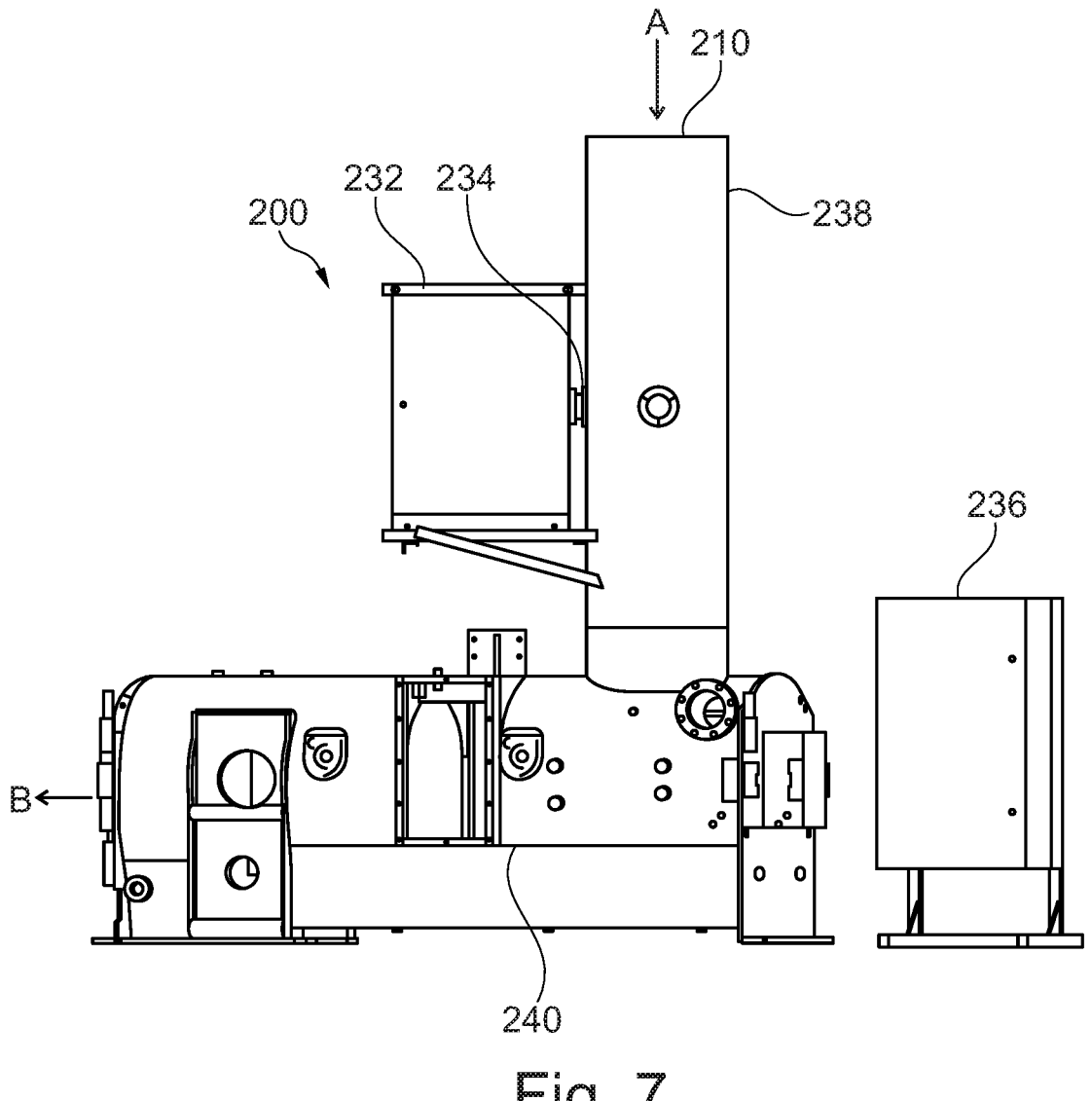
FIG. 7 is a representation of a Laser Induced Breakdown Spectroscopy (LIBS) device capable of functioning as a content analyser, incorporated into a material feeding system, according to an example of the present invention.

FIG. 7 is a representation of a Laser Induced Breakdown Spectroscopy (LIBS) device capable of functioning as a material analyser, incorporated into a feeding system 200 according to the present invention. The heating system may be a coal feeding system.

The material feeding system 200 shown, comprises a LIBS system, which is part of a material sensing device 210. The device 210 comprises a laser cabinet 232, a linkage assembly 234, and a control cabinet 236. These components are all part of the feeding system 200, which takes fuel into A, and outputs the fuel at B.

The laser cabinet 232 comprises a laser and a spectroscopic device for analysing the data. This is attached to the coal downspout 238 via the linkage assembly 234. The coal downspout 238 channels the coal from A to the conveyer 240. The coal is then output at B, and then can be fed into a combustion chamber for various processes. The control cabinet 236 is connected to the material sensing device 210, and this control cabinet can be connected to various other systems, external to the material feeding system 200.

For example, after the material is analysed when passing the LIBS system at the laser cabinet 232, the calorific value of the material (e.g. coal) may be higher than the previous batch of material (e.g. coal). The control cabinet 236 may then reduce the speed of the conveyor 240, which would reduce the flow rate of the material (e.g. coal) going to the combustion chamber after B.

Figure 8:
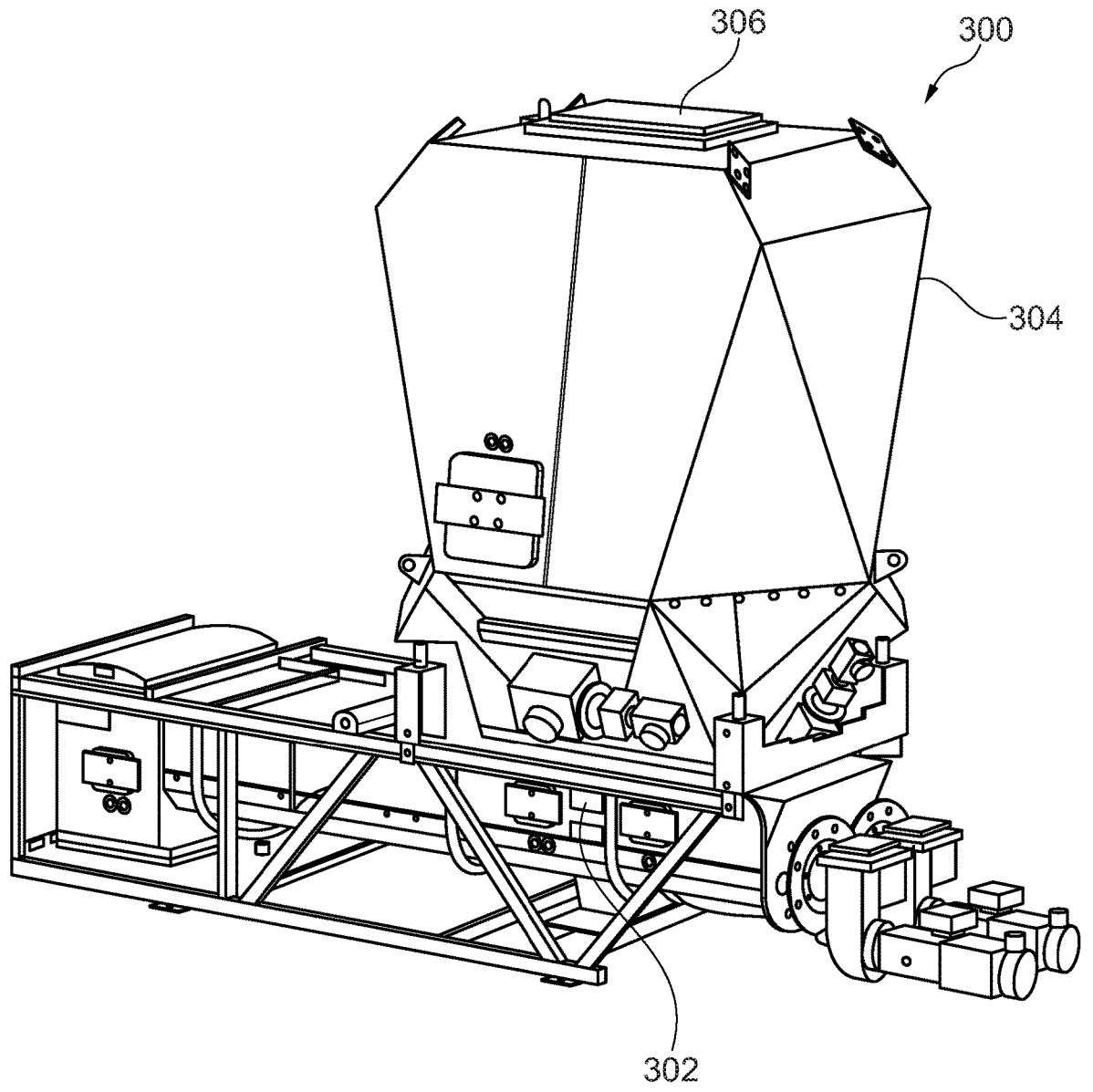
FIG. 8 is a representation of a hopper and material feeder system, which comprises load cells to provide mass flow rate data, according to an example of the present invention.

FIG. 8 is a representation of a hopper and feeder system 300, which comprises load cells 302 to provide mass flow rate data, according to an example of the present invention. The hopper and feeder system 300 is shown as an example inlet for material into a production plant. Ordinarily, the material is inserted into the hopper 304, through the hopper aperture 306.

The material then gets agitated in the hopper 304, and is also weighed at the same time, by the load cells 302. The load cells 302 are located underneath the hopper 304, and give an accurate measurement of the material inside the hopper 304. The measurements from the load cells 302 can be used to calculate the mass flow rate of the material, which is an important parameter to control the temperatures of, for example, combustion chambers.

The hopper and feeder system 300 may be located at any material inlet according to the present invention. For example, the system 300 may be located at fuel inlets for a cement production line.

Alternatively, the hopper and feeder system 300 may be combined with a material sensing device as has been previously described. Combining these features into one apparatus will give a calorific value to the fuel, through LIBS for example, and will give a mass flow rate through the hopper and feeder system's load cells 302. This set up would give an accurate energy flow rate, in MJ/hr, for example. If the calorific value of the fuel changes (if alternative fuels are used for example), then the mass flow rate will need to be changed accordingly, to maintain a constant energy flow rate into the combustion chambers. It should be borne in mind that the heat output from the combustion chambers in many processes needs to be accurately and precisely controlled, to maintain good output qualities.

Figure 9:
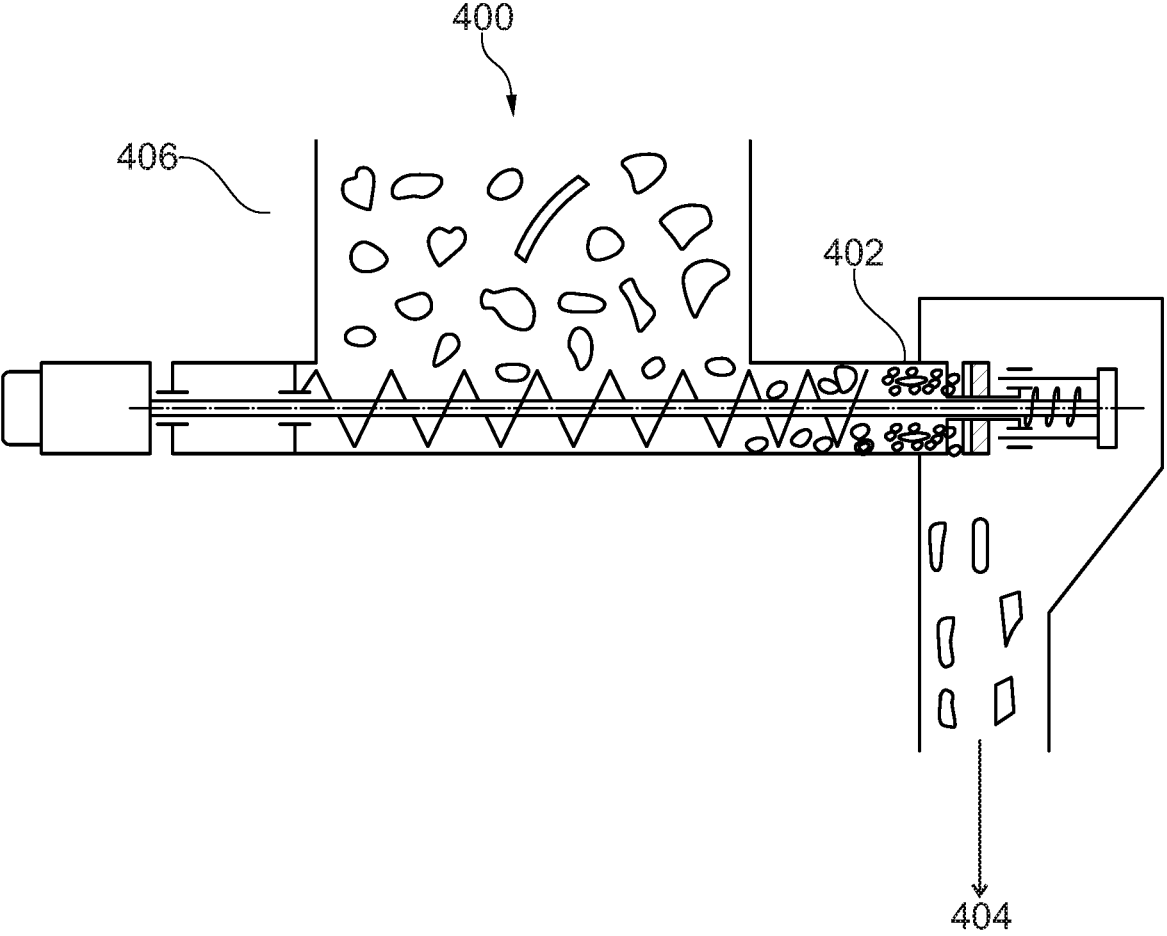
FIG. 9 is a representation of a screw-feeder capable of being part of the hopper and feeder system shown in FIG. 8, according to an example of the present invention.

FIG. 9 is a representation of a screw-feeder 406 capable of being part of the hopper and feeder system shown in FIG. 8, according to an example of the present invention. This screw-feeder 406 is a typical component in a material conveying process.

The main function of this screw-feeder 406 is to transfer material from the inlet 400, to the outlet 404, whilst normalising the flow rate of the material. This particular example is shown, as the screw-feeder 406 has an area which has a high density of material 402. This is where LIBS analysis in accordance with the invention would be carried out. LIBS analysis is generally more accurate when the material to be analysed is densely populated.

In example of the present invention, the materials being analysed may be densely populated. This may be done by using a screw-feeder 406 as shown in FIG. 9, or it may be done in other ways.

Whilst specific examples of the present invention have been described above, it will be appreciated that departures from the described embodiments may still fall within the scope of the present invention and such variations are not to be regarded as a departure from the spirit and scope of the invention, and all such modifications as would be obvious to one skilled in the art are to be included within the scope of the following claims. For example, any suitable type and number of mass flow measurement and material sensing devices may be used.

What is claimed is:

1. A material feeding control apparatus for a combustion chamber comprising:
   a feed rate measurement device to provide an online mass and/or volume flow measurement of a material; and
   a material sensing device to provide online content measurement real-time data of a calorific value of the material,
   wherein the material feeding control apparatus is adapted to provide a controlled feed of material into the combustion chamber based on the online mass and/or volume flow measurement and the calorific value of the material.

2. The material feeding control apparatus according to claim 1, wherein the feed rate measurement device is an online mass flow measurement device which provides an online mass flow measurement of the material.

3. The material feeding control apparatus according to claim 2, wherein the online mass flow measurement of the material is performed in real-time.

4. The material feeding control apparatus according to claim 1, wherein the material feeding control apparatus comprises a control system to analyze measurements and data collected from the feed rate measurement device and/or the material sensing device.

5. The material feeding control apparatus according to claim 4, wherein the control system provides real-time analysis of data collected from the feed rate measurement device and/or the material sensing device.

6. The material feeding control apparatus according to claim 5, wherein the control system is connected to adjustable chamber controls, and wherein data from the feed rate measurement device and/or material sensing device is used to adjust the chamber controls.

7. The material feeding control apparatus according to claim 1, wherein the material feeding control apparatus is combined with a conveying/feeding device, a screw conveyor, star feeder or belt feeder, in a conveying line of a feeder.

8. The material feeding control apparatus according to claim 1, wherein the feed rate measurement device provides a mass flow measurement of the material entering the combustion chamber.

9. The material feeding control apparatus according to claim 1, wherein the feed rate measurement device comprises at least one or a plurality of gravimetric sensors or load cells.

10. The material feeding control apparatus according to claim 1, wherein there is at least one or a plurality of feed rate measurement devices which in real-time constantly and/or intermittently monitor the mass of the material being fed.

11. The material feeding control apparatus according to claim 1, wherein the material feeding control apparatus measures in real-time constantly and/or intermittently a composition or type of the material and how much of the material is being sent to a feeder.

12. The material feeding control apparatus according to claim 11, wherein the material sensing device determines the composition or type of the material being fed into the material feeding control apparatus.

13. The material feeding control apparatus according to claim 1, wherein the material sensing device is a spectroscopic device or a laser spectroscopic technique.

14. The material feeding control apparatus according to claim 1, wherein the material sensing device is a laser induced breakdown spectroscopy (LIBS) apparatus.

15. The material feeding control apparatus according to claim 1, wherein prior to the material being fed into the material feeding control apparatus the material is initially milled and/or ground and/or broken up.

16. The material feeding control apparatus according to claim 1, wherein fuel being fed into the material feeding control apparatus is primary and/or secondary fuel.

17. The material feeding control apparatus according to claim 1, wherein fuel being fed into the material feeding control apparatus is secondary fuel including any one of or combination of the following: biofuels; waste derived fuels; agricultural biomass; refuse derived fuels (RDF); shredded plastics; foil chips; conditioned sewage sludge; woodchips and saw meal; shredded or full tyres; palm kernel shells; food waste; nuts; peanuts; rice husks; and/or animal meal.

18. A method of providing a controlled feed of material into a combustion chamber, the method comprising:
    providing a feed rate measurement device to provide an online mass and/or volume flow measurement of the material;
    providing a material sensing device to provide an online real-time data of a calorific value of the material; and
    providing a controlled feed of the material into the combustion chamber based on the online mass and/or volume flow measurement and the calorific value of the material.

19. The method of providing a controlled feed of fuel material according to claim 18, wherein the feed of material is in a cement production line.

20. A combustion apparatus comprising:
    a combustion chamber;
    an input feed for feeding material into the combustion chamber; and
    a material feeding control apparatus operably connected to the input feed, the material feeding control apparatus comprising a feed rate measurement device to provide an online mass and/or volume flow measurement of the material and a material sensing device to provide an online real-time data of a calorific value of the material,
    wherein the material feeding control apparatus provides a controlled feed of the material to the combustion chamber based on the online mass and/or volume flow measurement and the calorific value of the material.

21. The apparatus according to claim 20, wherein the online mass flow and/or volume measurement of the material is performed in real-time.

22. The apparatus according to claim 20, wherein the feed rate measurement device is an online mass flow measurement device which provides a real-time online mass flow measurement of the material.

* * * * *